United States Patent [19]

Thallon

[11] Patent Number: 4,974,298
[45] Date of Patent: Dec. 4, 1990

[54] SHADE CLOTH CONNECTORS

[76] Inventor: Ronald L. Thallon, 92 Brisbane Corso, Fairfield, Queensland, Australia, 4103

[21] Appl. No.: 313,600

[22] Filed: Feb. 21, 1989

[51] Int. Cl.⁵ .............................................. A44B 9/02
[52] U.S. Cl. ................................... 24/710.5; 160/404; 16/16
[58] Field of Search ..................... 24/710.5, 570, 703.5, 24/703.2, 703.1; 160/404, 380; 16/5, 7, 6, 16

[56] References Cited

U.S. PATENT DOCUMENTS

| | | | |
|---|---|---|---|
| 1,782,695 | 11/1930 | Prez | 16/16 X |
| 2,417,922 | 3/1947 | Frazer | 160/404 X |
| 2,890,145 | 6/1959 | Milnes | 16/16 X |
| 3,538,536 | 11/1970 | Pecorella | 16/16 |
| 3,760,454 | 9/1973 | Heinzel et al. | 16/16 |

FOREIGN PATENT DOCUMENTS

| | | | |
|---|---|---|---|
| 491442 | 3/1953 | Canada | 16/16 |
| 607933 | 9/1948 | United Kingdom | 160/404 |

*Primary Examiner*—Laurie K. Cranmer
*Attorney, Agent, or Firm*—Poms, Smith, Lande & Rose

[57] ABSTRACT

A connector strip (10) is provided for securing fabric, such as shade cloth (16), to a frame member (17). The connector strip (10) has nailing apertures (12) at intervals therealong and it is provided with longitudinally spaced elongate projections or barbs (13) struck therefrom and adapted for passage through the fabric to be secured by the connector strip (10) to the frame member (17). The barbs (13) are struck from transverse portions of the strip (10) so as to form respective barb face portions (29) extending substantially longitudinally along the strip (10). These face portions (29) bear against fabric retained thereby and tensioned transversely to the strip (10).

5 Claims, 3 Drawing Sheets

U.S. Patent    Dec. 4, 1990    Sheet 1 of 3    4,974,298
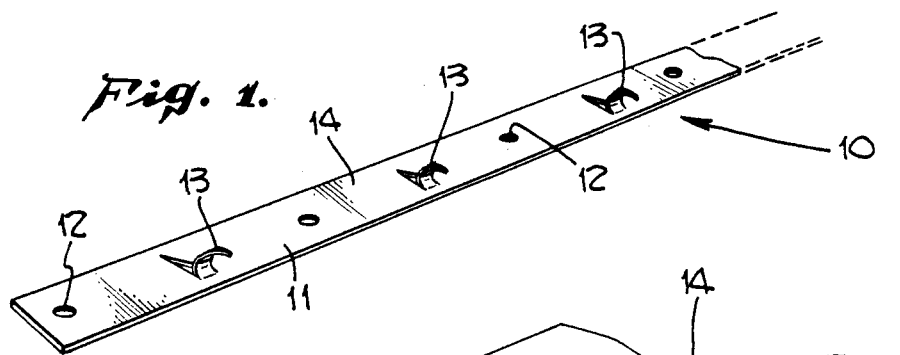
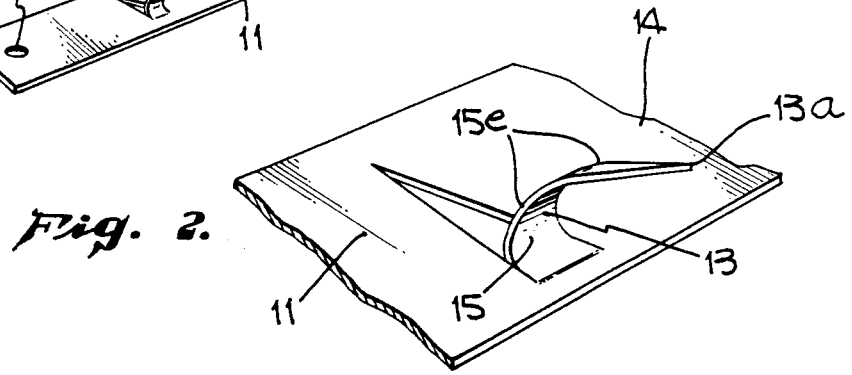
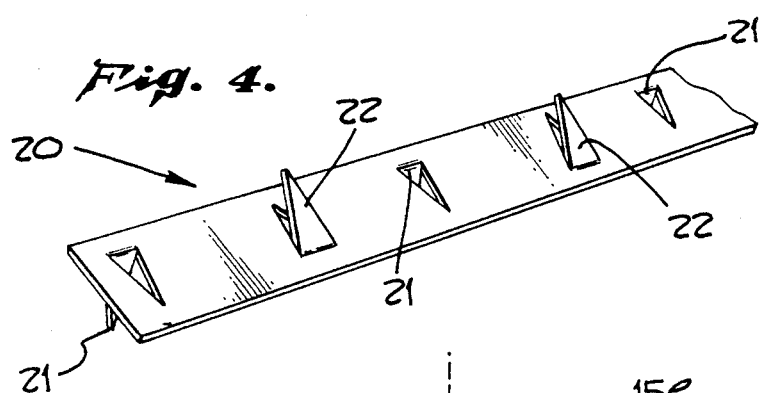
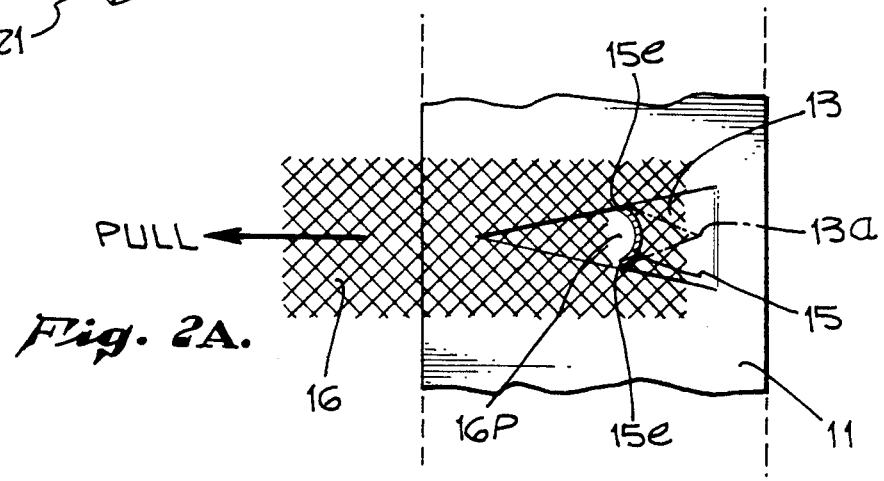

SHADE CLOTH CONNECTORS

This invention relates to connector for shade cloth and the like fabric.

Shade cloth is used in various applications such as in shade houses to assist in the control of the environment within the shade house and as covering for outdoor areas to provide both a reduction of the sun's intensity and protection against insects. Shade cloth is normally supplied in relatively wide continuous lengths and in use it is secured to spaced supporting frame members by securing one edge to one frame member with nails or pressed metal fasteners or the like and then stretching the cloth to the opposite frame prior to fastening the cloth thereto. This can be a difficult task as the framework for the shade cloth frequently does not provide adequate support for a worker and the use of spaced connectors makes it difficult to obtain an even stretch along the cloth.

Furthermore, because of the nature of the available fastenings it is difficult to secure shade cloth to a frame in a neat and effective manner. Difficulty may also be experienced in connecting panels of shade cloth together in an edge to edge relationship or in an overlapping or overlying relationship.

This invention aims to alleviate the abovementioned disadvantages and to provide shade cloth connectors which will be reliable and efficient in use. Other objects and advantages of this invention will hereinafter become apparent.

With the foregoing and other objects in view, this invention in one aspect resides broadly in a connector assembly for securing fabric to a member, said connector assembly including:

an elongate mounting strip having a fabric contacting face;

mounting means spaced longitudinally along said strip whereby said strip may be secured to the member at intervals therealong, and said fabric contacting face having longitudinally spaced elongate projections thereon which constitute fabric retaining projections adapted for passage through the fabric to be secured by said connector assembly to said member.

Preferably the mounting strip has segments provided with mounting means whereby said mounting strip may be secured face-down to a frame and the fabric retaining projections or barbs are spaced longitudinally from said mounting aperture. Preferably each barb has a face portion formed from one of said opposed major faces and which bears against tensioned fabric retained thereby and said face portions extending substantially longitudinally along said mounting strip. Of course the barbs could be arranged to extend longitudinally along the strip if desired.

For the purposes of this specification, the term "fabric" is to be taken to mean any flexible membrane-like material including woven materials and continuous films such as plastics film and the like. Reference herein to a face portion extending substantially longitudinally along a strip is to be understood as also embracing a reference to a curved face portion having a sector chord which extends substantially longitudinally along the strip.

The barbs may be arranged in rows along the strip and preferably the barbs are arranged in groups including laterally spaced barbs. It is also preferred that the bars be formed such that the opposed side edges thereof do not engage with the fabric such as shade cloth whereby they cut into the cloth. For this purpose the barbs may be pressed from the mounting strip from a position in the plane of the strip and through an angle of approximately 90 degrees so as to provide hooks with a longitudinally-curved base surface which engages the shade cloth. The barbs may also be pressed from the strip to a form having a curved cross-sectional configuration such that the side edges of the barbs are spaced rearwardly from the curved central portion thereof.

The barbs may be spaced equally along the strip, but it is preferred that they be arranged in barb groups at either side of securing means such as nails, or screws or the like. Barb groups may be equally spaced along the strip and may contain any desired number of barbs, such as two or three barbs. Suitably, the barbs in a barb group may be spaced approximately four millimetres apart, and a distance of forty millimetres may be provided between barb groups to permit striking of the securing nails with a hammer. The barbs in each group may be placed alternately adjacent opposite edges of the strip. Of course the spacing between barb groups may be reduced when screws or rivets are used or when no securing means are provided.

In the preferred embodiment of the invention, the mounting strip is a metal strip provided with a series of barbs spaced therealong and pressed or struck therefrom, and intermediate apertures between each or selected spaced pairs of barbs or barb groups through which a fastener such as a nail or a screw or the like may pass. If desired, a plurality of intermediate apertures may be provided spaced along the strip between a selected pair of barbs or barb groups whereby a fastener may be passed through an aperture adjacent a cantilevered cut end of a strip such that support for the cantilevered cut end is maximised. These apertures constitute the mounting means as may the apertures from which the barbs are pressed.

Suitably, the strip has a width of about twelve millimetres and the barbs extend transversely and have a base width in the longitudinal direction of the strip of between one and five millimetres and a length in the transverse direction of the strip which is approximately four to eight millimetres. It is preferred that the strip extend transversely away from the tips of the slots from which the barbs are pressed to an inner edge by a distance which is less then the spacing between barbs in a barb pair such that a secure corner joint may be made between a pair of strips by cutting a first strip with a barb pair at its end and placing a second strip across the end of the first strip with the first barb of a barb pair on the second strip passing through a slot and the second barb of a barb pair adjacent the inner edge.

Preferably the barbs taper to a point at their outer ends. It is also preferred that the barbs form the uppermost projections beyond the mounting strip such that shade cloth or the like may be drawn across the strip and readily engaged with the barbs.

In a further aspect this invention resides broadly in a connector assembly for fabric, said connector assembly including:

an elongate mounting strip having a fabric contacting face;

said fabric contacting face having longitudinally spaced elongate projections thereon which constitute fabric retaining projections adapted for passage through the fabric to be connected to said connector assembly, and each said projection having a curved cross-sectional configuration and being bent back upon itself to form a hook having an abutment face which is curved both transversely and longitudinally so as to provide a retaining face which will minimise damage to fabric connected thereto.

In order that this invention may be more readily understood and put into practical effect, reference will now be made to the accompanying drawings which illustrate typical embodiments of the present invention and wherein:

FIG. 1 is a perspective view of an embodiment of the invention;

FIG. 2 is an enlarged view of one of the retaining barbs illustrated in FIG. 1;

FIG. 2A is a top plan view of the retaining barb shown in FIG. 2;

FIGS. 4 to 6 illustrate further embodiments of the invention.

Figure 6:
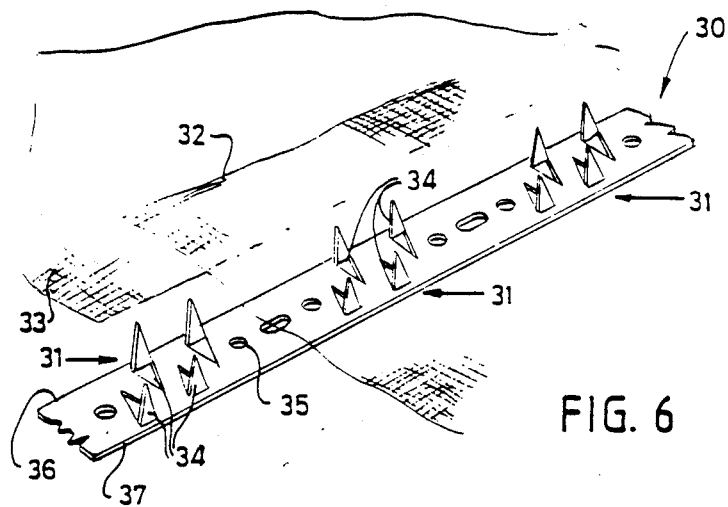

As shown in FIG. 1 the connector strip 10 is in the form of a strip of galvanised steel 11 approximately twelve millimetres wide by zero point six millimetres thick and provided with spaced mounting apertures 12 at intervals of between twenty and fifty millimetres. A retaining barb 13 is pressed from the mounting strip at a position substantially centrally between each mounting aperture 12. The barbs 13 extend transversely of the strip and substantially in a common plane and form the only projections which extend above the top surface 14 of the strip 11. As can been seen in detail in FIG. 2, each barb is formed as a tapered barb having a narrow base of two to three millimetres and a length of approximately eight millimetres.

Each barb 13 has a curved cross-sectional configuration as illustrated and is bent back upon itself to form a hook having an abutment face 15 which is curved both transversely and longitudinally so as to provide a retaining face which will minimise damage to the shade cloth when the latter is tensioned such as between a pair of opposed connector assemblies 10 as illustrated.

As illustrated in FIG. 2A, which is a section through the hook 13 of FIG. 2, the abutment face 15 is curved whereby the central portion is displaced outwardly from the adjacent side edges 15e towards the apex 13a of the hook. Thus when fabric 16 is tensioned against the hook 13, as illustrated, the majority of the load taken by the hook 13 is transferred through the curved abutment face 15 and the contact pressures between the fabric 16 and the side edges 15e is relieved. Thus tearing of the fabric 16 through contact with the relatively sharp side edges 15e will be alleviated.

Figure 3:
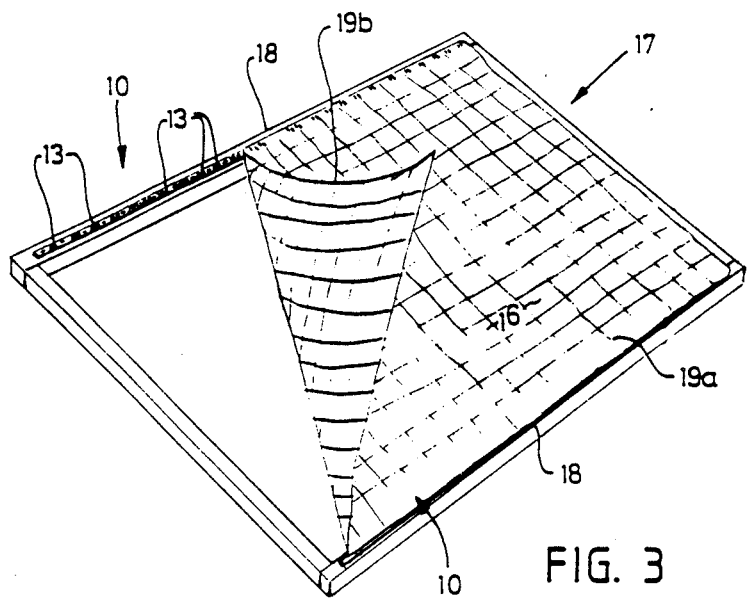
FIG. 3 is a perspective view illustrating an application of the invention.

In use, as shown in FIG. 3 shade cloth 16 or the like is supported on a frame 17 by firstly nailing the connector assembly 10 along the spaced members 18 of the frame 17 with the barbs 13 of the respective connector assemblies 10 opposing one another. One edge portion 19a of the shade cloth is then placed along one connector assembly 10 and the barbs 13 are pushed through the shade cloth 16 to retain it at regularly spaced intervals along its length. The other side 19b of the shade cloth 16 may then be pulled tight and lowered to be engaged by the opposing barbs 13 and held thereby be held tensioned between the frame members 18. The barbs may then be hammered downwardly to retain the cloth or they may be left in their inclined attitude to enable further adjustment to be readily provided at a later date.

Preferably, the free outer portion of the shade cloth at each edge is doubled back onto the barbs and engaged thereon prior to the latter being hammered to a locked position about the edge of the shade cloth. The remaining free portion of the shade cloth may be trimmed by running a knife along the frame through the shade cloth with the blade guided by the outer-most edge of the mounting strip so as to provide a neat termination along the edge of the frame.

The strips 10 may be formed in any desired lengths such as in two metre lengths for use by home handymen and the like or in short lengths for providing spaced connections intermediate the edge connections of the cloth. Of course short lengths may be used at spaced intervals to secure the edge of the cloth. Preferably however, the connector assembly is coiled into a storage coil from which it may be withdrawn axially from the coil or longitudinally by rotating the coil. For this purpose suitable mounting means may be provided to support the coil to enable the connector assembly to be withdrawn therefrom or the coil of connector strip can be supported within a cardboard carton having an aperture in one corner thereof through which a selected length of strip may be withdrawn, causing the concealed coil to rotate.

In the embodiment illustrated in FIG. 4, the strip 20 is provided with a first set of barbs 21 extending from the underside of the metal strip for securing the strip to a timber frame and a second set of barbs 22 extending upwardly from the strip for securing the shade cloth or other material such as insect screen or plastics sheeting.

The connector strips 10 and 20 may be provided with a series of retainers formed therein, engageable with complementary retainers on a cover strip adapted to overlie the connector strip to conceal the gathered edge of cloth secured by the connector strip. Suitably the complementary retainers are adapted for push on engagement with one another and if desired the cover strip may be provided with a side flange which covers the side edge of the strip. Furthermore the strip could be in the form of an angle member whereby it may be retained about the corner section of the frame member.

Figure 5:
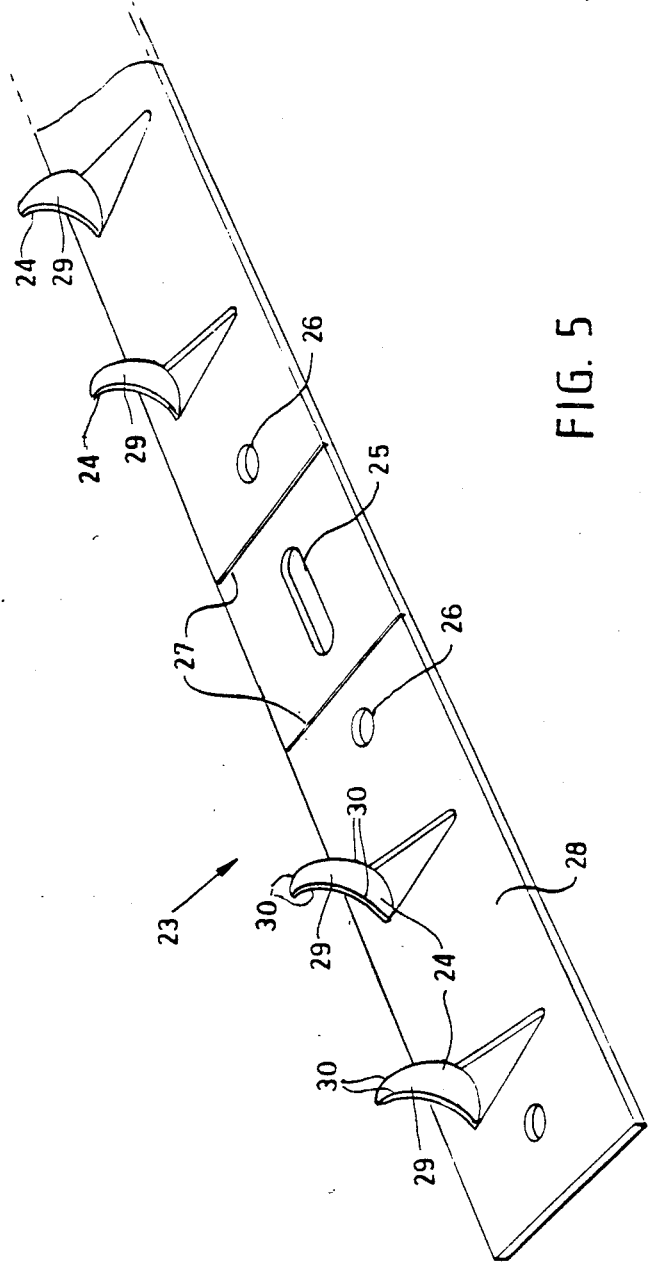

A preferred connector strip 23 is illustrated in FIG. 5. In this embodiment there are provided barb pairs 24 separated by a series of mounting apertures, namely a central mounting slot 25 and outer circular mounting apertures 26. Bend/brake ribs 27 are formed across the strip 23 at opposite sides of the elongate slot 25.

The barbs 24 are inclined at approximately forty-five degrees to the strip face 28 and are formed with a curved cross section, as illustrated, to provide central load bearing sections 29 intermediate the barb edges 30.

The connector strip 31 illustrated in FIG. 6 is adapted to join adjacent fabric panels 32 and 33 together, either above a frame member or in suspension. The connector includes groups of four barbs 34 pressed from tapered slots 35 which extend across the strip 31. The alternate slots are opposed to one another whereby alternate barbs project upwardly at right angles from the common outer face 36 of the strip 31 and adjacent opposite edges 37 and 38 of the strip. The barbs are so formed that they can be easily bent to an inclined position after they have penetrated the overlapped edges of the shade cloth sheets 32, 33 to retain the shade cloth thereon as illustrated and thus join them together.

It will of course be realised that the above has been given only by way of illustrative example of the invention and that all such modifications and variations thereto as would be apparent to persons skilled in the art are deemed to fall within the broad scope and ambit of the invention as is defined in the appended claims.

I claim:

1. A connector assembly for securing fabric stretched between spaced frame members to at least one of said frame members, said connector assembly including:
   an elongate mounting strip having an elongated cross-section providing opposed major faces which constitute a frame contacting face and a fabric contacting face respectively, and opposed minor faces which constitute the longitudinal edges of said mounting strip;
   mounting means spaced longitudinally along said mounting strip whereby said mounting strip may be secured to a frame at intervals therealong with said frame contacting face against the frame member;
   a plurality of substantially identical fabric hooks extending in a common direction from said fabric contacting face and transverse to said mounting strip and being spaced regularly along said mounting strip and disposed intermediate spaced ones of said mounting means;
   said hooks each being formed from a tapered portion of said mounting strip which is disposed inwardly of said longitudinal edges, each said tapered portion having a base part which remains integral with the mounting strip and side edges which converge away from said base part to intersect at respective apex parts of said hooks, said tapered portion being disposed intermediate said side edges which extend transverse to said mounting strip and across a major portion of the width of said strip and said side edges being struck from said mounting strip and each said tapered portion being hook-shaped with said taper extending above said base part, and said tapered portion being further curved in a longitudinal direction relative to said mounting strip such that a section of said hook disposed centrally between said side edges and intermediate said base part and said apex part is spaced closer to said apex part than are the side edges which are aligned with said section in the longitudinal direction of the mounting strip 2. A connector assembly as defined in claim 1, wherein said mounting means are apertures spaced along said strip.

3. A connector assembly as defined in claim 2, wherein said apertures are disposed between groups of said hooks.

4. A connector assembly as defined in claim 1, wherein said elongate mounting strip is a thin metal strip having a rectangular cross-sectional configuration.

5. A connector assembly as defined in claim 1, wherein said mounting strip is formed with a plurality joining hooks substantially identical to said fabric hooks and extending from said fabric contacting face between spaced ones of said mounting means and oppositely to said fabric hooks.

* * * * *